(12) United States Patent
Chen

(10) Patent No.: US 11,483,478 B2
(45) Date of Patent: Oct. 25, 2022

(54) PANORAMIC VIDEO ANTI-SHAKE METHOD AND PORTABLE TERMINAL

(71) Applicant: ARASHI VISION INC., Guangdong (CN)

(72) Inventor: Cong Chen, Shenzhen (CN)

(73) Assignee: ARASHI VISION INC., Guangdong (CN)

( * ) Notice: Subject to any disclaimer, the term of this patent is extended or adjusted under 35 U.S.C. 154(b) by 0 days.

(21) Appl. No.: 17/415,563

(22) PCT Filed: Sep. 30, 2019

(86) PCT No.: PCT/CN2019/109482
§ 371 (c)(1),
(2) Date: Jun. 17, 2021

(87) PCT Pub. No.: WO2020/125131
PCT Pub. Date: Jun. 25, 2020

(65) Prior Publication Data
US 2022/0060626 A1    Feb. 24, 2022

(30) Foreign Application Priority Data
Dec. 18, 2018 (CN) .......................... 201811550596.7

(51) Int. Cl.
*H04N 5/232* (2006.01)
(52) U.S. Cl.
CPC ..... *H04N 5/23258* (2013.01); *H04N 5/23238* (2013.01); *H04N 5/23254* (2013.01); *H04N 5/23264* (2013.01)
(58) Field of Classification Search
CPC .......... H04N 5/23258; H04N 5/23238; H04N 5/23254; H04N 5/23264
See application file for complete search history.

(56) References Cited

U.S. PATENT DOCUMENTS

2012/0063757 A1  3/2012  Yamazaki
2013/0163815 A1  6/2013  Mai
(Continued)

FOREIGN PATENT DOCUMENTS

| CN | 101715067 A | 5/2010 |
| CN | 101976429 A | 2/2011 |
| CN | 103314570 A | 9/2013 |

(Continued)

OTHER PUBLICATIONS

International Search Report dated Dec. 27, 2019 issued in corresponding Parent Application No. PCT/CN2019/109482 (3 pages).

(Continued)

*Primary Examiner* — Nicholas G Giles
(74) *Attorney, Agent, or Firm* — Polsinelli PC

(57) ABSTRACT

The present invention is applicable to the field of videos, and provides a panoramic video anti-shake method and a portable terminal. The method comprises: obtaining world coordinates of any reference point in a world coordinate system in real time, and simultaneously obtaining camera coordinates corresponding to the reference point in the portable terminal and an angular velocity value of a current state of a gyroscope in the portable terminal; smoothing the motion of a camera using an extended Kalman filter; decomposing the smoothed motion to synthesize virtual lens motion of a free lens mode, and calculating the rotation amount of the virtual lens; and re-projecting an original video to generate a stable video.

13 Claims, 1 Drawing Sheet

(56) References Cited

U.S. PATENT DOCUMENTS

2014/0232818 A1*  8/2014  Carr .................... H04N 5/2224
                                                    348/36
2016/0301870 A1   10/2016  Matsuoka
2020/0154059 A1*  5/2020  Derry .................. H04N 5/2253

FOREIGN PATENT DOCUMENTS

| CN | 104902142 A | 9/2015 |
|----|-------------|--------|
| CN | 106210544 A | 12/2016 |
| CN | 107040694 A | 8/2017 |
| CN | 108462838 A | 8/2018 |
| CN | 108564554 A | 9/2018 |
| CN | 108933896 A | 12/2018 |
| CN | 109561254 A | 4/2019 |
| JP | 2012-60271 A | 3/2012 |
| WO | 2018/184423 A1 | 10/2018 |

OTHER PUBLICATIONS

Chinese Office Action dated Nov. 26, 2019 issued in corresponding Patent Application No. 201811550596.7 (5 pages).
Jia et al., "Real-Time 3D Rotation Smoothing for Video Stabilization", 48th Asilomar Conference on Signals, Systems and Computers, IEEE, Nov. 2, 2014, pp. 673-677.
Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180.
European Search Report dated Jul. 21, 2022 issued in corresponding Patent Application No. 19898738.0 (14 pgs).

* cited by examiner

PANORAMIC VIDEO ANTI-SHAKE METHOD AND PORTABLE TERMINAL

CROSS REFERENCE TO RELATED APPLICATION

The present application is a National Phase of International Application No. PCT/CN2019/109482, filed on Sep. 30, 2019 claims priority to Chinese Patent Application No. 201811550596.7, filed on Dec. 18, 2018 and entitled "Panoramic Video Anti-Shake Method and Portable Terminal", and the content of which is herein incorporated by reference in their entireties.

TECHNICAL FIELD

The present disclosure relates to the field of panoramic video, and particularly to a panoramic video anti-shake method and a portable terminal.

BACKGROUND

At present, when a panoramic video is shot, it is usually to hold a panoramic shooting device in hand to shoot. When a mobile shooting is taken, a phenomenon of jitter occurs in the panoramic shooting video due to unstable hands. When a panoramic view angle is acquired, the focus of the original lens is often lost due to the movement or shaking of the camera, which affects the viewing experience of the panoramic video. One of the current solutions is to use a pan-tilt to stabilize the panoramic shooting device to stabilize the pictures taken. However, the disadvantage is that the pan-tilt is more expensive and the volume is generally larger, and the pan-tilt does not completely solve the problem of picture jitter when shooting the video with a handheld panoramic shooting device.

When a panoramic video viewer wants to watch from a viewing angle of an original motion direction of the video, and the impact of artificial shaking on the video can be avoided, it is necessary to enable the video to keep the viewing angle changing in the original shooting direction and keep the video stable. Accordingly, it is necessary to study a panoramic video anti-shake method that can retain the change state of the original shooting direction of the shooting device.

SUMMARY

Technical Problem

The purpose of the present disclosure is to provide a panoramic video anti-shake method, a computer-readable storage medium and a portable terminal, and is intended to solve the problem of the loss of the original lens focus when the viewing angle of the panoramic video is acquired. The method can, through decomposing the motion of the camera, retain the original shooting angle of the camera, synthesize the motion of the virtual lens and generate a stable video.

Technical Solution

In the first aspect, the present disclosure provides a panoramic video anti-shake method, which includes:
acquiring a world coordinate of any one reference point in a world coordinate system in real time, and simultaneously acquiring a camera coordinate corresponding to the reference point in a portable terminal and an angular velocity value of a gyroscope in the portable terminal in a current state;
smoothing a motion of the camera by using an extended Kalman filter;
decomposing the smoothed motion, synthesizing a motion of a virtual lens in a free lens mode, and calculating a rotation quantity of the virtual lens;
re-projecting an original video according to the rotation quantity of the virtual lens and a rotation matrix by which the camera coordinate is transformed to the world coordinate, to generate a stable video.

In the second aspect, the present disclosure provides a computer-readable storage medium, on which a computer program is stored, the computer program, when executed by a processor, implements the steps of the above-mentioned panoramic video anti-shake method.

In the third aspect, the present disclosure provides a portable terminal, which includes:
one or more processors;
a memory; and
one or more computer programs, wherein the one or more computer programs are stored in the memory and configured to be executed by the one or more processors, wherein the processor, when executing the computer programs, implement the steps of the above-mentioned panoramic video anti-shake method.

Advantages

In the present disclosure, by decomposing the motion of the camera and retaining the synthesized motion of the virtual lens at the original shooting angle of the camera, the stable video can be generated. Therefore, this method can keep smooth motion of the rendering lens, generate the stable video, and retain the original shooting angle of the camera, which has strong robustness to large noise scenes and most sports scenes.

DETAILED DESCRIPTION

In order to make the objectives, technical solution, and advantages of the present disclosure clearer, the present disclosure will be described in detail with reference to the accompanying drawings and embodiments. It should be appreciated that the specific embodiments described here are only used for explaining the present disclosure, rather than limiting the present disclosure.

In order to illustrate the technical solution of the present disclosure, specific embodiments are used for description below.

Embodiment I

Figure 1:
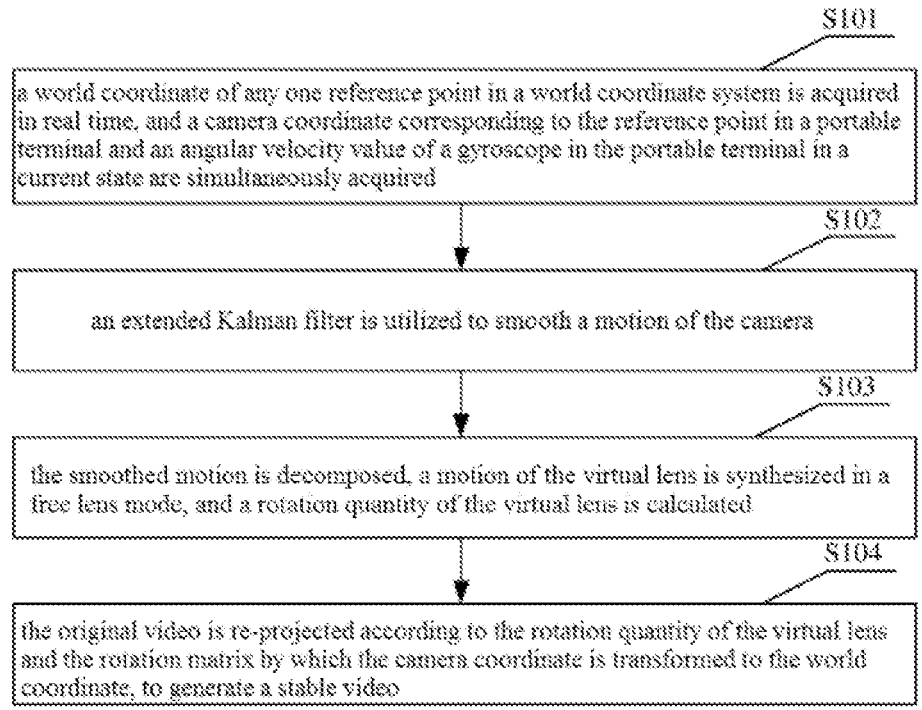
FIG. 1 is a flow chart showing a panoramic video anti-shake method according to an embodiment I of the present disclosure.

Referring to FIG. 1, the panoramic video anti-shake method provided by the Embodiment 1 of the present disclosure includes the following steps.

S101: a world coordinate of any one reference point in a world coordinate system is acquired in real time, and a camera coordinate corresponding to the reference point in a portable terminal and an angular velocity value of a gyroscope in the portable terminal in a current state are simultaneously acquired.

In the embodiment I of the present disclosure, S101 can specifically be as follows.

The world coordinate of the reference point is $P_w$, and the camera coordinate is $P_c$, the following relationship is specifically included:

$$P_w R_{w2c} P_c \qquad (1)$$

In the formula (1), $$R_{w2c} = \begin{bmatrix} r_{11} & r_{12} & r_{13} \\ r_{21} & r_{22} & r_{23} \\ r_{31} & r_{32} & r_{33} \end{bmatrix}$$

is a rotation matrix by which the camera coordinate is transformed to the world coordinate; the elements $r_{11}$ to $r_{33}$ are elements of the rotation matrix $R_{w2c}$, $$\begin{bmatrix} r_{11} & r_{12} & r_{13} \\ r_{21} & r_{22} & r_{23} \\ r_{31} & r_{32} & r_{33} \end{bmatrix}^T \cdot \begin{bmatrix} r_{11} & r_{12} & r_{13} \\ r_{21} & r_{22} & r_{23} \\ r_{31} & r_{32} & r_{33} \end{bmatrix} = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} r_{11} & r_{12} & r_{13} \\ r_{21} & r_{22} & r_{23} \\ r_{31} & r_{32} & r_{33} \end{bmatrix}^T = I,$$

I is the unit matrix.

The step of acquiring the angular velocity value of the gyroscope in the portable terminal in real time specifically includes: an angular velocity sensor is adopted to read a three-axis angular velocity value as $w_k$.

S102: an extended Kalman filter is utilized to smooth a motion of the camera.

The extended Kalman filter algorithm linearizes the non-linear system, and then performs Kalman filter. The Kalman filter is a high-efficiency recursive filter which can estimate a state of a dynamic system from a series of measurements that do not completely contain noises.

In the embodiment I of the present disclosure, S102 can specifically be as follows.

The extended Kalman filter algorithm is utilized to establish a state model and an observation model of a motion state of the camera; specifically:

the state model is:

$$\begin{cases} \tilde{q}_k = \Phi(\tilde{w}_{k-1}) \cdot \tilde{q}_{k-1} \\ \tilde{w}_k = \tilde{w}_{k-1} \end{cases} ; \qquad (2)$$

the observation model is:

$$\begin{cases} q_k = \tilde{q}_k \\ w_k = \tilde{w}_k \end{cases} . \qquad (3)$$

In the formulas (2) and (3), k is time, $w_k$ is an obtained angular velocity, and $q_k$ is an obtained observation vectors of the rotation quantity; $\tilde{w}_k$ and $\tilde{q}_k$ are state values of the angular velocity and rotation quantity, $\tilde{w}_{k-1}$ are $\tilde{q}_{k-1}$ state values of the angular velocity and rotation quantity at time k−1; $q_k$ is a quaternion representation of $R_{w2c}^{-1}$; $w_k$ is the angular velocity value of the gyroscope; $w_k=\lg(q_{k+1}\cdot q_k^{-1})$, $\Phi(\tilde{w}_{k-1})$ is a state transition matrix at the time k−1;

$\Phi(\tilde{w}_{k-1})=\exp([\tilde{w}_{k-1}]_x)$, $\tilde{q}_k$ is the quaternion representation of the estimated smoothed motion of the camera, $\tilde{q}_k$ is the state value estimated by the value of $\tilde{q}_{k-1}$ at the previous time.

The specific process of updating the prediction includes: at time k, $\tilde{q}_{k-1}$ estimated at the previous time and the observation value $q_k$ the current time are utilized to update the estimation of the state variable $\tilde{q}_k$ to obtain an estimated value at the current time. The predicted value $\tilde{q}_k$ is the rotation quantity of the virtual lens at the k-th time.

S103: the smoothed motion is decomposed, a motion of the virtual lens is synthesized in a free lens mode, and a rotation quantity of the virtual lens is calculated.

In the embodiment I of the present disclosure, S103 can specifically be as follows.

The coordinate of the reference point in the virtual lens is $P_{\bar{c}}$, and the following relationship is specifically included:

$$P_{\bar{c}} = R_{\bar{c}2w} P_w; \qquad (4)$$

In formula (4), $R_{\bar{c}2w}$ is a 3*3 matrix, which is the rotation quantity of the virtual lens.

The free lens mode is a mode in which motions in the original shooting changing directions of the shooting device are retained. For the synthesized motion of the virtual lens in the free lens mode, the rotation quantity is set as $R_{\bar{c}2w}=\tilde{R}$, $\tilde{R}$ is the original motion trajectory of the shooting device.

the step of decomposing the smoothed motion, synthesizing the motion of the virtual lens in the free lens mode and calculating the rotation quantity of the virtual lens specifically includes:

For the synthesized motion of the virtual lens, the shaking is prevented in the free lens mode, then $R_{\bar{c}2w}=\tilde{R}_k$, where $\tilde{R}_k$ is the rotation quantity of $\tilde{q}_k$.

It should be noted that the Rodrigues formula can be utilized to obtain the rotation matrix R from the quaternion after the unit vector is rotated by an angle θ. Specifically, the quaternion is set as $q(\theta,x,y,z)^T$, then calculation formula of the rotation matrix R is:

$$R = \begin{bmatrix} \cos\theta + x^2(1-\cos\theta) & -z\sin\theta + xy(1-\cos\theta) & y\sin\theta + xz(1-\cos\theta) \\ z\sin\theta + xy(1-\cos\theta) & \cos\theta + y^2(1-\cos\theta) & -x\sin\theta + yz(1-\cos\theta) \\ -y\sin\theta + xz(1-\cos\theta) & x\sin\theta + yz(1-\cos\theta) & \cos\theta + z^2(1-\cos\theta) \end{bmatrix}.$$

S104: the original video is re-projected according to the rotation quantity of the virtual lens and the rotation matrix by which the camera coordinate is transformed to the world coordinate, to generate a stable video.

In the embodiment I of the present disclosure, S104 can specifically be as follows.

A corresponding relationship between a pixel in the original video frame and a pixel in an output video frame is calculated, and then interpolation resampling is performed on the original video frame according to the corresponding relationship to generate the output video frame, and finally a stable video is generated.

The pixel in the original video frame is set as $P_s$, and the pixel in the corresponding output video frame is $P_d$, then the corresponding relationship is: $P_s = D_c(K_c R_{w2c}^{-1} R_{\bar{c}2w}^{-1} K_c^{-1} P_d)$ where $P_s=[x_s,y_s]^T$, $P_d=[x_d,y_d]^T$, $x_s$ and $y_s$ are the coordinate values of the abscissa and ordinate of the pixel $P_s$ in the original video frame; $x_d$ and $y_d$ are the coordinate values of the abscissa and ordinate of the pixel $P_d$ in the output video frame respectively; $K_c$ and $D_c$ are respectively an internal parameter and a distortion model of the camera, $K_{\tilde{c}}$ is a projection internal parameter of the virtual lens.

Then the step of performing the interpolation resampling on the original video frame $I_s$ according to the corresponding relationship and generating the output video frame $I_d$ specifically includes:

$$I_d(P_d) = \frac{\sum w_i I_s(P_s^i)}{\sum w_i} \quad (5)$$

In formula (5), $w_i$ is the interpolation weight, and $P_s^i \in U(P_s, \delta)$ is a neighborhood coordinate of $P_s$.

Embodiment II

In the embodiment II of the present disclosure, a computer-readable storage medium is provided, which stores a computer program that, when executed by a processor, implements the steps of the panoramic video anti-shake method provided in the embodiment I of the present disclosure.

The computer-readable storage medium can be a non-transitory computer-readable storage medium.

Embodiment III

Figure 2:
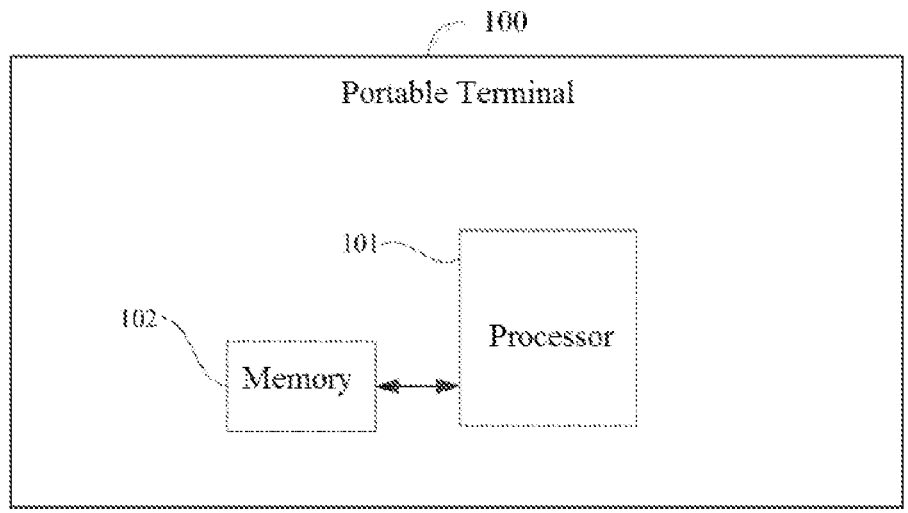
FIG. 2 is a schematic structure diagram of a portable terminal according to an embodiment III of the present disclosure.

FIG. 2 shows a specific structure block diagram of a portable terminal provided in the Embodiment III of the present disclosure. The portable terminal 100 includes: one or more processors 101, a memory 102, and one or more computer programs; the processor 101 is connected to the memory 102 by a bus; the one or more computer programs are stored in the memory 102, and are configured to be executed by the one or more processors 101; and the processor 101, when executing the computer program, implements the steps of the panoramic video anti-shake method provided in the embodiment I of the present disclosure.

In the present invention, by decomposing the motion of the camera, retaining the original shooting viewing angle of the camera and synthesizing the motion of the virtual lens, and the stable video can be generated. Therefore, this method can maintain smooth motion of the rendering lens, generate the stable video, and retain the original shooting angle of the camera. Accordingly, when the user is watching the panoramic video, this method can avoid artificial video jitters and retain changes in the viewing angle in the original direction of the panoramic video. Therefore, this method retains the original shooting angle of the camera, which can keep the smooth motion of the rendering lens and generate the stable video, and has strong robustness to large noise scenes and most sports scenes.

Those of ordinary skill in the art can understand that all or part of the steps in the various methods of the above-mentioned embodiments can be completed by a program instructing relevant hardware. The program can be stored in a computer-readable storage medium, and the storage medium can include: a Read Only Memory (ROM), a Random Access Memory (RAM), a magnetic disk or an optical disk, etc.

The above are merely the preferred embodiments of the present disclosure and are not intended to limit the present disclosure. Any modification, equivalent replacement and improvement made within the spirit and principle of the present disclosure shall be regarded as the protection scope of the present disclosure.

What is claimed is:

1. A panoramic video anti-shake method, comprising:
    acquiring a world coordinate of any one reference point in a world coordinate system in real time, and simultaneously acquiring a camera coordinate corresponding to the reference point in a portable terminal and an angular velocity value of a gyroscope in the portable terminal in a current state;
    smoothing a motion of the camera by using an extended Kalman filter;
    decomposing the smoothed motion, synthesizing a motion of a virtual lens in a free lens mode, and calculating a rotation quantity of the virtual lens;
    re-projecting an original video according to the rotation quantity of the virtual lens and a rotation matrix by which the camera coordinate is transformed to the world coordinate, to generate a stable video.

2. The method according to claim 1, wherein the world coordinate of the reference point is $P_w$, the camera coordinate is $P_c$, and an angular velocity value is $w_k$, the following relationship is specifically comprised:

$$P_w R_{w2c} P_c$$

wherein, $$R_{w2c} = \begin{bmatrix} r_{11} & r_{12} & r_{13} \\ r_{21} & r_{22} & r_{23} \\ r_{31} & r_{32} & r_{33} \end{bmatrix}$$

is the rotation matrix by which the camera coordinate is transformed to the world coordinates, elements $r_{11}$ to $r_{33}$ are elements of the rotation matrix $R_{w2c}$, $$\begin{bmatrix} r_{11} & r_{12} & r_{13} \\ r_{21} & r_{22} & r_{23} \\ r_{31} & r_{32} & r_{33} \end{bmatrix}^T \cdot \begin{bmatrix} r_{11} & r_{12} & r_{13} \\ r_{21} & r_{22} & r_{23} \\ r_{31} & r_{32} & r_{33} \end{bmatrix} = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} r_{11} & r_{12} & r_{13} \\ r_{21} & r_{22} & r_{23} \\ r_{31} & r_{32} & r_{33} \end{bmatrix}^T = I,$$

where I is an unit matrix;

the acquiring the angular velocity value of the gyroscope in the portable terminal in real time specifically comprises: using an angular velocity sensor to read a three-axis angular velocity value $w_k$.

3. The method according to claim 1, wherein a coordinate of the reference point in the virtual lens is $P_{\tilde{c}}$, the following relationship is specifically comprised:

$$P_{\tilde{c}} = R_{\tilde{c}2w} P_w; \quad (4)$$

wherein $R_{\tilde{c}2w}$ is a 3*3 matrix and is the rotation quantity of the virtual lens.

4. The method according to claim 1, wherein the smoothing the motion of the camera by using the extended Kalman filter specifically comprises:
    using a state mode $$\begin{cases} \tilde{q}_k = \Phi(\tilde{w}_{k-1}) \cdot \tilde{q}_{k-1} \\ \tilde{w}_k = \tilde{w}_{k-1} \end{cases};$$

using an observation model $$\begin{cases} q_k = \tilde{q}_k \\ w_k = \tilde{w}_k \end{cases};$$

wherein, k is time, $w_k$ is an obtained angular velocity, and $q_k$ is an obtained observation vector of the rotation quantity, $\tilde{w}_k$ and $\tilde{q}_k$ are state values of the angular velocity and the rotation quantity, $\tilde{w}_{k-1}$ and $\tilde{q}_{k-1}$ are state values of the angular velocity and the rotation quantity at time k−1, and $q_k$ is a quaternion representation of $R_{w2c}^{-1}$, $w_k$ is the angular velocity value of the gyroscope, $w_k = \lg(q_{k+1} \cdot q_k^{-1})$, $\Phi(\tilde{w}_{k-1})$ is a state transition matrix at the time k−1, $\Phi(\tilde{w}_{k-1}) = \exp([\tilde{w}_{k-1}]_x)$, $\tilde{q}_k$ is a quaternion representation of the estimated smoothed motion of the lens, $\tilde{q}_k$ is a state value evaluated by a value of $\tilde{q}_{k-1}$ at previous time.

5. The method according to claim 4, wherein the decomposing the smoothed motion, synthesizing the motion of the virtual lens in the free lens mode and calculating the rotation quantity of the virtual lens specifically comprises:
for the synthesized motion of the virtual lens, preventing shaking in the free lens mode, so that $R_{\bar{c}2w} = \tilde{R}_k$, wherein $\tilde{R}_k$ is the rotation quantity of $\tilde{q}_k$.

6. The method according to claim 1, wherein the re-projecting the original video to generate the stable video specifically comprises:
calculating a corresponding relationship between a pixel in an original video frame and a pixel in an output video frame, and then performing interpolation sampling on the original video frame according to the corresponding relationship, generating the output video frame and finally generating the stable video;
wherein, the pixel in the original video frame is set as $P_s$, and the pixel in the corresponding output video frame is $P_d$, accordingly the corresponding relationship is: $P_s = D_c(K_c R_{w2c}^{-1} R_{\bar{c}2w}^{-1} K_{\bar{c}}^{-1} P_d)$, wherein, $P_s = [x_s, y_s]^T$, $P_d = [x_d, y_d]^T$, $x_s$ and $y_s$ are respectively coordinate values of an abscissa and an ordinate of the pixel $P_s$ in the original video frame; $x_d$ and $y_d$ are respectively coordinate values of an abscissa and an ordinate of the pixel $P_d$ in the output video frame; $K_c$ and $D_c$ are respectively an internal parameter and a distortion model of the camera, $K_{\bar{c}}$ is a projection internal parameter of the virtual lens;

$$R_{w2c} = \begin{bmatrix} r_{11} & r_{12} & r_{13} \\ r_{21} & r_{22} & r_{23} \\ r_{31} & r_{32} & r_{33} \end{bmatrix}$$

is the rotation matrix by which the camera coordinate is transformed to the world coordinates; $R_{\bar{c}2w}$ is a 3*3 matrix and is the rotation quantity of the virtual lens;
the performing the interpolation sampling on the original video frame $I_s$ according to the corresponding relationship, and generating the output video frame $I_d$ specifically comprises:

$$I_d(P_d) = \frac{\sum w_i I_s(P_s^i)}{\sum w_i}$$

wherein $w_i$ is an interpolation weight, $P_s^i \in U(P_s, \delta)$ is a neighborhood coordinate of $P_s$.

7. A computer-readable storage medium, on which a computer program is stored, wherein the computer program, when executed by a processor, implements the steps of the panoramic video anti-shake method according to claim 1.

8. A portable terminal, comprising:
one or more processors;
a memory; and
one or more computer programs, wherein the one or more computer programs are stored in the memory and configured to be executed by the one or more processors, wherein the processor, when executing the computer programs, implement following steps of a panoramic video anti-shake method:
acquiring a world coordinate of any one reference point in a world coordinate system in real time, and simultaneously acquiring a camera coordinate corresponding to the reference point in a portable terminal and an angular velocity value of a gyroscope in the portable terminal in a current state;
smoothing a motion of the camera by using an extended Kalman filter;
decomposing the smoothed motion, synthesizing a motion of a virtual lens in a free lens mode, and calculating a rotation quantity of the virtual lens;
re-projecting an original video according to the rotation quantity of the virtual lens and a rotation matrix by which the camera coordinate is transformed to the world coordinate, to generate a stable video.

9. The portable terminal according to claim 8, wherein the world coordinate of the reference point is $P_w$, the camera coordinate is $P_c$, and an angular velocity value is $w_k$, the following relationship is specifically comprised:

$$P_w = R_{w2c} P_c$$

wherein, $$R_{w2c} = \begin{bmatrix} r_{11} & r_{12} & r_{13} \\ r_{21} & r_{22} & r_{23} \\ r_{31} & r_{32} & r_{33} \end{bmatrix}$$

is the rotation matrix by which the camera coordinate is transformed to the world coordinates,
elements $r_{11}$ to $r_{33}$ are elements of the rotation matrix $R_{w2c}$, $$\begin{bmatrix} r_{11} & r_{12} & r_{13} \\ r_{21} & r_{22} & r_{23} \\ r_{31} & r_{32} & r_{33} \end{bmatrix}^T \cdot \begin{bmatrix} r_{11} & r_{12} & r_{13} \\ r_{21} & r_{22} & r_{23} \\ r_{31} & r_{32} & r_{33} \end{bmatrix} = \begin{bmatrix} r_{11} & r_{12} & r_{13} \\ r_{21} & r_{22} & r_{23} \\ r_{31} & r_{32} & r_{33} \end{bmatrix} \cdot \begin{bmatrix} r_{11} & r_{12} & r_{13} \\ r_{21} & r_{22} & r_{23} \\ r_{31} & r_{32} & r_{33} \end{bmatrix}^T = I,$$

where I is an unit matrix;
the acquiring the angular velocity value of the gyroscope in the portable terminal in real time specifically comprises: using an angular velocity sensor to read a three-axis angular velocity value $w_k$.

10. The portable terminal according to claim 8, wherein a coordinate of the reference point in the virtual lens is $P_{\bar{c}}$, the following relationship is specifically comprised:

$$P_{\bar{c}} = R_{\bar{c}2w} P_w; \quad (4)$$

wherein $R_{\bar{c}2w}$ is a 3*3 matrix and is the rotation quantity of the virtual lens.

11. The portable terminal according to claim 8, wherein the smoothing the motion of the camera by using the extended Kalman filter specifically comprises:

using a state model $$\begin{cases} \tilde{q}_k = \Phi(\tilde{w}_{k-1}) \cdot \tilde{q}_{k-1} \\ \tilde{w}_k = \tilde{w}_{k-1} \end{cases};$$

using an observation model $$\begin{cases} q_k = \tilde{q}_k \\ w_k = \tilde{w}_k \end{cases};$$

wherein, k is time, $w_k$ is an obtained angular velocity, and $q_k$ is an obtained observation vector of the rotation quantity, $\tilde{w}_k$ and $\tilde{q}_k$ are state values of the angular velocity and the rotation quantity, $\tilde{w}_{k-1}$ and $\tilde{q}_{k-1}$ are state values of the angular velocity and the rotation quantity at time k−1, and $q_k$ is a quaternion representation of $R_{w2c}^{-1}$, $w_k$ is the angular velocity value of the gyroscope, $w_k = \lg(q_{k+1} \cdot q_k^{-1})$, $\Phi(\tilde{w}_{k-1})$ is a state transition matrix at the time k−1, $\Phi(\tilde{w}_{k-1}) = \exp([\tilde{w}_{k-1}]_x)$, $\tilde{q}_k$ is a quaternion representation of the estimated smoothed motion of the lens, $\tilde{q}_k$ is a state value evaluated by a value of $\tilde{q}_{k-1}$ at previous time.

12. The portable terminal of claim 11, wherein the decomposing the smoothed motion, synthesizing the motion of the virtual lens in the free lens mode and calculating the rotation quantity of the virtual lens specifically comprises:

for the synthesized motion of the virtual lens, preventing shaking in the free lens mode, so that $R_{\bar{c}2w} = \tilde{R}_k$, wherein $\tilde{R}_k$ is the rotation quantity of $\tilde{q}_k$.

13. The portable terminal according to claim 8, wherein the re-projecting the original video according to the rotation quantity of the virtual lens and the rotation matrix by which the camera coordinate is transformed to the world coordinate to generate the stable video specifically comprises:

calculating a corresponding relationship between a pixel in an original video frame and a pixel in an output video frame, and then performing interpolation sampling on the original video frame according to the corresponding relationship, generating the output video frame and finally generating the stable video;

wherein, the pixel in the original video frame is set as $P_s$, and the pixel in the corresponding output video frame is $P_d$, accordingly the corresponding relationship is: $P_s = D_c(K_c R_{w2c}^{-1} R_{\bar{c}2w}^{-1} K_{\bar{c}}^{-1} P_d)$, wherein, $P_s = [x_s, y_s]^T$, $P_d = [x_d, y_d]^T$, $x_s$ and $y_s$ are respectively coordinate values of an abscissa and an ordinate of the pixel $P_s$ in the original video frame; $x_d$ and $y_d$ are respectively coordinate values of an abscissa and an ordinate of the pixel $P_d$ in the output video frame; $K_c$ and $D_c$ are respectively an internal parameter and a distortion model of the camera, $K_{\bar{c}}$ is a projection internal parameter of the virtual lens;

$$R_{w2c} = \begin{bmatrix} r_{11} & r_{12} & r_{13} \\ r_{21} & r_{22} & r_{23} \\ r_{31} & r_{32} & r_{33} \end{bmatrix}$$

is the rotation matrix by which the camera coordinate is transformed to the world coordinates; $R_{\bar{c}2w}$ is a 3*3 matrix and is the rotation quantity of the virtual lens;

the performing the interpolation sampling on the original video frame $I_s$ according to the corresponding relationship, and generating the output video frame $I_d$ specifically comprises:

$$I_d(P_d) = \frac{\sum w_i I_s(P_s^i)}{\sum w_i}$$

wherein $w_i$ is an interpolation weight, $P_s^i \in U(P_s, \delta)$ is a neighborhood coordinate of $P_s$.

\* \* \* \* \*